Patented May 30, 1933

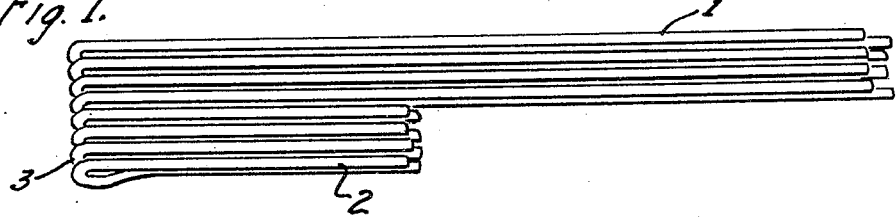
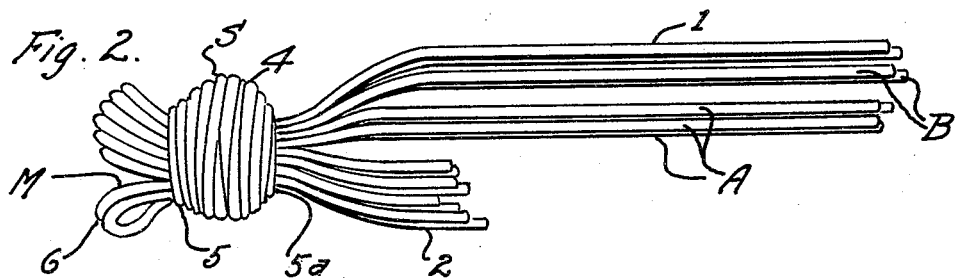
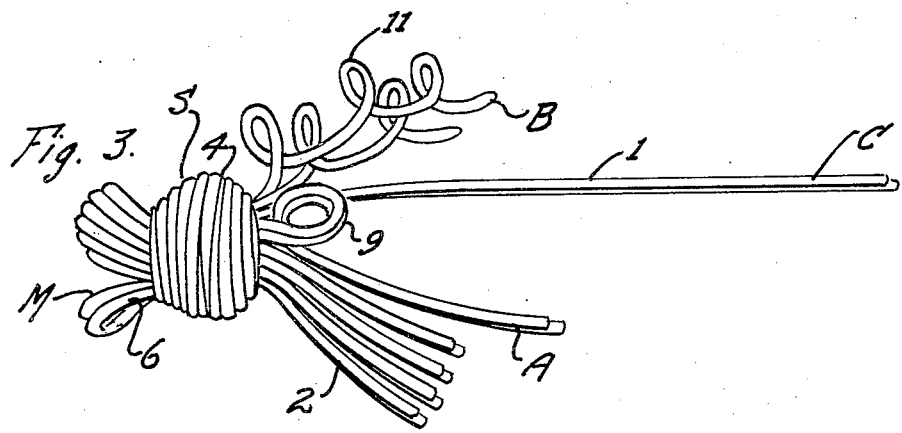
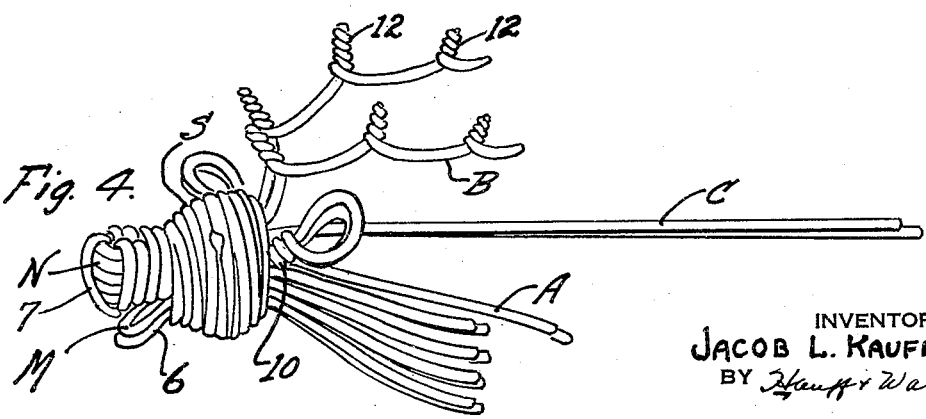

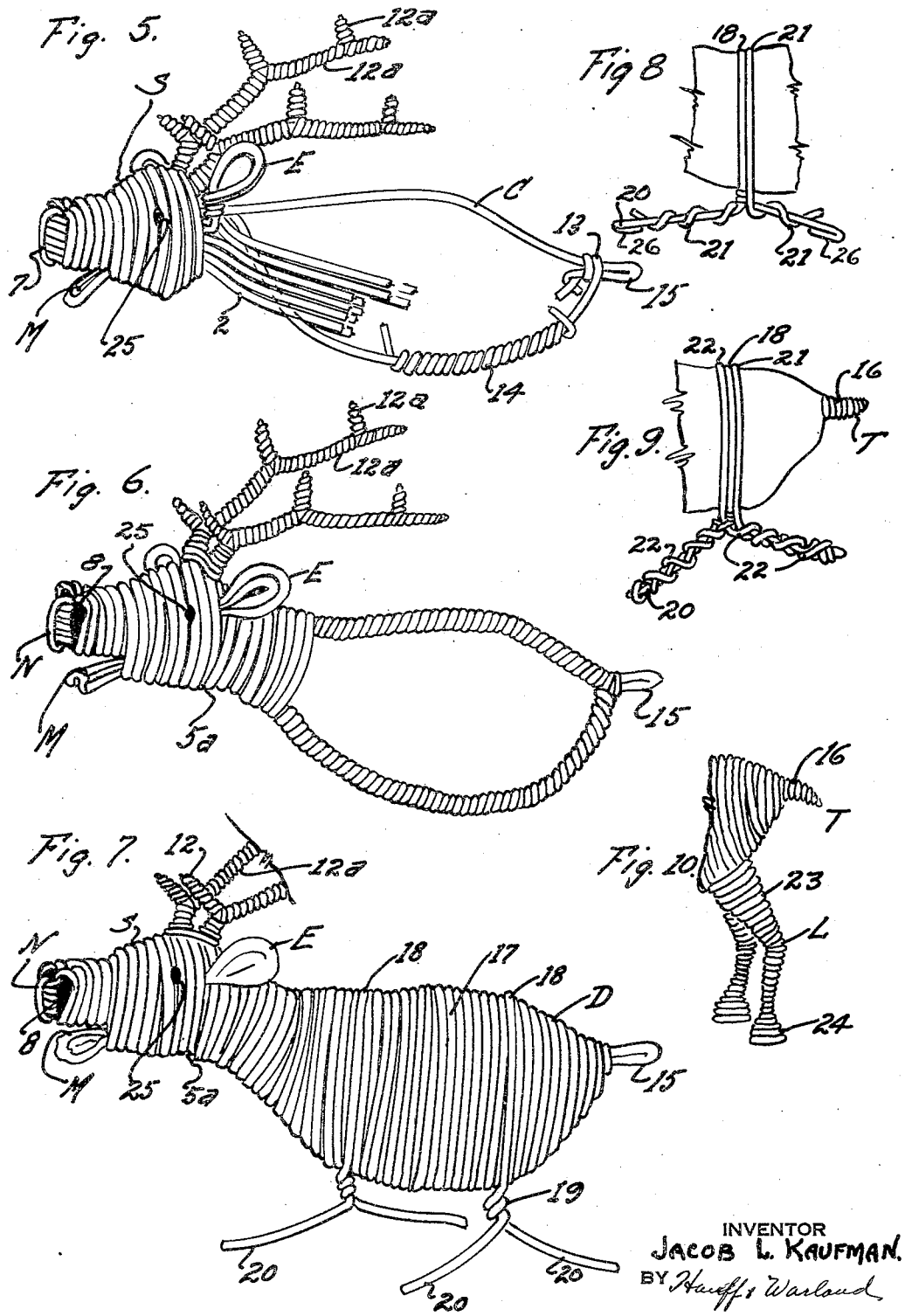

1,911,512

UNITED STATES PATENT OFFICE

JACOB L. KAUFMAN, OF NEW YORK, N. Y.

ANIMAL TOY AND PROCESS OF PRODUCING THE SAME

Application filed June 25, 1932. Serial No. 619,217.

The present invention relates to a process of producing animal toys having a very life-like appearance. The toys produced by this process are also considered to be comprehended in the scope of the invention.

According to this invention, the toys are produced solely from flexible strands of metal, having an outer covering of an unwoven fibrous material such as cotton, which are formed into the shape of the animal by suitably bending and intertwining the various strands employed. The elongated strands sold in the open market as pipe cleaners answer the purpose in a satisfactory manner. The unwoven fibrous covering of the strands serves to give the strands bulk while at the same time acting, especially when suitably colored, to simulate the hide or furry exterior of any particular animal.

My toys when made in this way have a very life-like appearance. This is due to the fact that it is possible to shape the strands to closely approximate the contours and outlines of the various parts of the animal it is desired to represent. Because of such life-like appearance, the toys, aside from their value as such, possess a certain aesthetic value fitting them for use as desk ornaments and the like.

It is moreover apparent that by forming the toys entirely from strands of the above mentioned material that they will be relatively flexible or pliable and hence will not be readily injured when subjected to the rough usage that toys generally receive at the hands of children. This property does not, however, in any way affect the solidity of the toy which is of course necessary in order for the toy to continue to resemble the animal which it was designed to represent.

The particular material and method which I use to form the toys also permit me to form toys of any animal despite the complexity of structure of the parts of the animal. Likewise, size is no impediment, since the animals can be constructed of any dimensions desired. Moreover, the flexibility of the material lends itself admirably to the construction of the animal in any position which is of course an attribute of importance in this field of work.

There is a decided additional advantage obtained by virtue of my invention which operates to materially enhance the importance thereof. This is the result of the possibility of employing my process as a means of educating a child in the skilled use of his hands. Inasmuch as the process merely involves a bending and intertwining of the various strands employed, it does not require the use of any instruments other than an ordinary plier and hence a child could soon be taught how to carry out the process. In so doing, the child would necessarily have to concentrate on the task at hand, which, however, would be a pleasant one, so that the child could quite quickly become adept in manipulating his hands. The child's education in the field of natural history would also be facilitated by the study of the various animals as a necessary prerequisite to the formation and construction thereof.

An adult could also be amused when carrying out my invention since it requires a study of the problems to be solved and concentration during the solution.

There are of course many animal toys in the market at the present day which have many varied modes of construction. Some, for instance, are made of a solid machined or worked base of wood or metal coated with a fabric serving to simulate the exterior of the animal desired. Others comprise an exterior sheath stuffed or packed with a padding of hair or the like, the sheath being reenforced by stays to retain the outlines of the animal. Still others resemble small caricatures of animals formed by shaping and interweaving flexible strands of metal covered with a fabric representing the hair or fur of an animal.

None of these toys, however, possesses the many and varied desired characteristics inherent in my invention. Either the toys require a machine construction, or if made by hand, the skill of an artisan or are too unstable and therefore readily destroyed when used, or are in no wise a replica of the animals sought to be produced. Likewise these toys are rather limited in the positions in which the animals can be represented.

It is accordingly an object of my invention to provide a process for making toys by which it will be possible to educate and instruct children.

It is a further object of my invention to provide a process which will serve to produce a toy having intrinsic and aesthetic value.

A further object resides in a process of making a very life-like animal toy of any size wth the parts arranged in any life-like position.

Another object resides in the formulation of a process for producing animal toys which can be carried out without the use of special instruments.

It is an additional object to produce a life-like animal toy, composed entirely of flexible strands of metal, covered with an unwoven fibrous material.

A further object resides in such a toy which is relatively solid and at the same time flexible enough to "give" under stress without breaking.

It is an additional object to produce a toy which very closely approximates the outlines of any animal and which represents the animal in any desired position.

Other and further important objects of this invention will become apparent from the following description and appended claims.

The invention is clearly illustrated in the accompanying drawings which show the various steps in forming a toy resembling an elk. This modification was selected solely because of the complexity of its construction.

Fig. 1 of the drawings discloses the initial positioning of the flexible strands to form a base for the body and head of the toy.

Fig. 2 shows the formation of the head and the mouth of the toy.

Fig. 3 illustrates the formation of the ears and antlers.

Fig. 4 discloses the completed ears and the formation of the nostrils.

Fig. 5 illustrates the completed antlers and the initial step in forming the outline of the body.

Fig. 6 shows a further step in the formation of the body while Fig. 7 discloses the completed body and the initial step in the formation of the legs.

Figs. 8 and 9 indicate the method of building up the legs of the animal and

Fig. 10 shows the completed hooves.

On the drawings

The base of the head and body are formed from a plurality, say 8 or 10, longitudinally extending strands 1 and 2 bent adjacent their mid points to provide a loop 3 (Fig. 1). Preferably the strands 2 are smaller than the strands 1 and are located beneath the strands 1 in order to facilitate the formation of the neck of the animal. It is not, however, essential to start with the small strands since certain larger strands can be cut down to size after the loop forming operation. A plurality of strands 4 are next wrapped transversely about the strands 1 and 2 at a point 5 spaced inwardly from the end of the loop 3. These strands serve to complete the outline of the skull or head S of the animal.

After the outline of the head has been completed, certain of the strands 2, indicated as 6 on the drawing, at the bottom of the loop 3 are forced away from the upper strands of the loop to provide an outline for the mouth M of the animal. The contour of the fore-face of the animal is then completed by lacing a strand 7, Fig. 4 through the upper strands of the loop 3 to thereby effect the formation of the animal's nostrils N. After the lacing operation the free ends of the strand 7 are preferably interlocked and turned into the loop 3 so that no rough edges will be exposed when the toy is completed. The nostrils can be made to very closely approximate those of a living animal by applying suitable chalk marks 8, Fig. 6, at the proper point in the upper part of the loop 3.

At this stage of the process, it is desirable to separate the free ends of the short strands 2 from the ends of the long strands 1 as shown, for example, in Fig. 2. After effecting this separation, it is best to produce in the ends of the strands a slight curve just below the bottom of head S to provide the arch 5a of the neck of the toy.

The ears E of the animal are formed by selecting two of the larger strands 1 at each side of the loop 3, said strands being marked A (Fig. 3) and forming in each of said sets of strands at a point just back of the transverse strands 4 a loop 9. The loops 9 are twisted about a number of times in order to securely interlock the strands forming the loops at the base of the loops as shown at 10 in Fig. 4. This positively ensures a retention of the desired form of the loops. The loops 9 thus formed are then flattened or otherwise suitably worked with in ordinary plier to give the loops the particular shape of the animal's ears which they must represent. In this case they will be flattened to produce the rather large, flat ears E characteristic of an elk. The free ends of the strands A after the loops 9 have been formed therein are placed alongside the free ends of the other short strands 2.

Certain other of the long strands 1 at opposite sides of the loop 3, said strands being indicated by reference numeral B, are employed to form the antlers of the elk. This result is secured by elevating said strands B above the main body of said strands 1, the transverse strands 4 acting as a fulcrum, and forming in strands B a plurality of loops 11, as shown in Fig. 3. These loops are next twisted about until they assume the form of solid projections 12 as illustrated in Fig. 4. To complete the outline of the antlers and to strengthen the same, reenforcing strands 12a are twisted about the strands B, as shown in Fig. 6. The free lower ends of these strands are imbedded between strands 4 of the head S of the animal in order to secure said strands in place and at the same time avoid the presence of any rough edges.

The remaining long strands 1 are next employed in the body construction of the animal. These strands, indicated by reference numeral C (Figs. 3, 4 and 5), are interlocked at their free ends 13 and the intermediate parts thereof spaced apart so that they are caused to assume the outline of the body of the animal. Strands 14 are then continuously wound about the intermediate parts of the strands C to fill up the space between said strands. The ends of the strands 14 are at all times turned inwardly into said space so that the finished body will be uniform and smooth. Said ends of course also act as a filling for said space. The free ends of the short strands 2 and strands A are also preferably forced into this space at the beginning of this operation and aid in providing a filling for it. After said space has been filled by strands 14, the body D is built up to approximate size by wrapping strands 17 transversely about the strands 14. It is to be particularly noted that the interlocking of the free ends of the strands C provides a projection 15 which serves to form the short tail T of the elk. A strand 16 compactly wound on this projection 15 gives the tail the desired external appearance.

While the above procedure for forming the body is to be preferred it must be borne in mind that said procedure is not absolutely essential to the success of my process. I may, for instance, form the body by merely wrapping transverse strands about strands C without first forming said strands into the outline of the body. When proceeding in this way, the wrapping of the transverse strands will begin adjacent the neck portion of the toy and will proceed progressively toward the rear. The strands will be only partially wrapped about the parallel strands thus leaving free ends which will be directed in a plane parallel to the plane of the base or longitudinally extending strands.

In order to form the legs L of the animal, a strand 18 is looped over the front and rear of the body base, the extending ends of the loop being then twisted together beneath said base at 19. The free ends 20 of said strands 18 are then spread apart so that they project horizontally outward from under the body. Other strands 21 and 22 are then looped over the body in a position alongside strands 19 and intertwined with said horizontally projecting ends 20 to a thickness sufficient to bring the legs up to approximately the required size. In arranging the strands 21 and 22 over the ends 20 of strands 18, said strands 21 and 22 should be twisted over the ends 20 alternately in opposite directions so that the free ends of strands 20 and 21 may be interlocked to thereby securely fasten them on the strands 18. When the legs have been brought up to approximately the desired size, strands 23 may be transversely wound thereon to give a smooth exterior appearance to the legs. It is important in looping strands 21 and 22 over the body that they be situated beside and not upon strands 18 and each other since otherwise projections and humps will be produced which are exceedingly difficult to smooth out after the leg-forming operation.

It will be noted from Figs. 8 and 9 that the lower-most parts 20 of strands 18 are folded upon themselves at 26. These folds provide a base for the hooves 24 of the animal. The hooves are made to closely simulate that of the animal by suitably spreading the strands going into their formation after that part of the animal has reached the proper dimensions.

The animal in this stage of formation is substantially complete. It is now only necessary to wrap sufficient strands about the body to give the body the exact contour of the elk. The outer strands of the body, head and limbs may then be suitably colored with a piece of crayon or the like. Eyes 25 may be provided for the animal by forming depressions at the proper places in the head S and applying spots of color to these depressions. The mouth of the animal may also be made to have a life-like appearance by suitably shaping and coloring the lowermost strands of the loop 3.

An animal produced in this way will have a hard yet flexible body which will readily give to shocks. In addition, when the parts are properly proportioned, the animal will appear as an almost exact replica of an elk.

It is to be understood, of course, that various other animal toys may be made in exactly the same manner, since the formation of such other animals will only involve the steps described above. It is also to be understood that by suitably bending the limbs of the toy, the toy may be made to assume any desirable life-like position of the animal.

After the animal has been completed it may, if desired, be mounted upon plaques and the like to provide an ornament for a desk or a similar piece of furniture.

I realize that various changes may be made in the details of my invention without departing from the spirit thereof. I consequently do not intend to be limited upon the patent granted except as is necessitated by the prior art and the appended claims.

What I claim is:

1. A toy of the configuration of an animal, composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, a number of other strands compactly and transversely overlying said longitudinally extending strands to a thickness sufficient to provide the desired contour for the head and body and other strands looped over the body and providing the legs of the animal.

2. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, a tie-strand substantially completely surrounding the inner and outer portions of the upper strands of said loop, said strand providing the proper configuration for the animal's nostrils, a number of other strands compactly and transversely overlying said longitudinally extending strands to a thickness sufficient to provide the desired contour for the head and body and other strands looped over the body providing the legs of the animal.

3. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, a plurality of overlapping transverse strands arranged on said longitudinally extending strands at a point spaced inwardly from the end of said loop and completing the formation of the head of the animal, certain of the outer longitudinally extending strands having a loop therein slightly to the rear of said transverse strands to provide the ears for the animal, a number of other strands compactly and transversely overlying said longitudinally extending strands to a thickness sufficient to provide the desired contour for the head and body and other strands looped over the body providing the legs of the animal.

4. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, a plurality of overlapping transverse strands arranged on said longitudinally extending strands at a point spaced inwardly from the end of said loop and completing the formation of the head of the animal, certain of the outer longitudinally extending strands having a loop therein slightly to the rear of said transverse strands to provide the ears for the animal, a number of other strands compactly and transversely overlying said longitudinally extending strands to a thickness sufficient to provide the desired contour for the head and body, other strands looped over the body at the fore and rear thereof and secured together beneath said body with their ends projecting free, additional strands also looped over said body and wrapped about the free ends of said first strands to a thickness sufficient to bring the legs up to the desired size.

5. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, a plurality of overlapping transverse strands arranged on said longitudinally extending strands at a point spaced inwardly from the end of said loop and completing the formation of the head of the animal, certain of the outer longitudinally extending strands having a loop therein slightly to the rear of said transverse strands to provide the ears for the animal, a number of other strands compactly and transversely overlying said longitudinally extending strands to a thickness sufficient to provide the desired contour for the head and body, other strands looped over the body at the fore and rear thereof and secured together beneath said body with their ends projecting free, additional strands also looped over said body and wrapped alternately in opposite directions about the free projecting ends of said first looped strands, the ends of said latter strands being secured together and said latter strands being arranged on the free projecting ends of said first looped strands to a thickness sufficient to bring the legs up to the desired size.

6. A toy of the configuration of a horned ruminant, composed entirely of flexible strands of metal covered with an unwoven fibrous material and having body, head and limb portions, the base of the body and head comprising a plurality of longitudinally extending strands having a loop in the head end of the animal, the under-strands of said loop being spaced from the upper strands to provide the outline of the mouth, a tie-strand substantially completely surrounding the inner and outer portions of the upper strands of said loop, said strand providing the proper configuration for the animal's nostrils, a plurality of overlapping transverse strands arranged on said longitudinally extending strands at a point spaced inwardly from the end of said loop and completing the formation of the head of the animal, certain of the outer longitudinally extending strands having loops therein slightly to the rear of said transverse strands to provide the ears for the animal, certain other of said longitudinally extending strands being spaced above the body portion and having projections extending at an angle to the main portion of said strands to provide the horns for said ruminant, a number of other strands compactly and transversely overlying said longitudinally extending strands to a thickness sufficient to provide the desired contour for the body and other strands looped over the body serving as the legs for the animal.

7. A process for forming a toy having the configuration of an animal which comprises forming the base of the body and head of the animal by bending a plurality of flexible strands of metal covered with an unwoven fibrous material at a point intermediate their ends to provide a loop at the head end of the animal, transversely winding over said longitudinally extending strands at a point spaced inwardly from the end of said loop, a plurality of said strands to provide the outline of the head of the animal, spacing the lower strands of the loop from the upper strands to produce the outline of the mouth, wrapping a further plurality of strands transversely about said longitudinally extending strands to a thickness sufficient to bring the body up to the desired size, looping other strands over the body and securing said strands together beneath the body to provide a base for the legs of the animal.

8. A process for forming a toy having the configuration of an animal which comprises forming the base of the body and head of the animal by bending a plurality of flexible strands of metal covered with an unwoven fibrous material at a point intermediate their ends to provide a loop at the head end of the animal, transversely winding over said longitudinally extending strands at a point spaced inwardly from the end of said loop, a plurality of said strands to provide the outline of the head of the animal, spacing the lower strands of the loop from the upper strands to produce the outline of the mouth, lacing a strand transversely over the upper strands of said loop to provide the nostrils for the animal, wrapping a further plurality of strands transversely about said longitudinally extending strands to a thickness sufficient to bring the body up to the desired size, looping other strands over the body and securing said strands together beneath the body to provide a base for the legs of the animal.

9. A process for forming a toy having the configuration of an animal which comprises forming the base of the body and head by bending a plurality of longitudinally extending flexible strands of metal covered with an unwoven fibrous material at a point intermediate their ends to provide a loop at the head end of the animal, transversely winding over said longitudinally extending strands at a point spaced inwardly from the end of said loop a plurality of strands to provide the outline of the head, spacing the lower strands of the loop from the upper strands to produce the outlines of the mouth, at a point directly behind said transverse strands forming loops in certain of said longitudinally extending strands to produce the ears of the animal, lacing a strand about the upper strands in said loop to provide the configuration of the nostrils, wrapping a further plurality of strands transversely about the longitudinally extending strands to a thickness sufficient to give the body the desired contour, looping other strands over the body, joining them together beneath the body to provide projecting ends which form the base for the legs and looping other strands over the body and intertwining them with said projecting ends to a thickness sufficient to bring the legs up to the desired size.

10. A process for forming a toy having the configuration of an animal which comprises forming the base of the body and head by bending a plurality of longitudinally extending flexible strands of metal covered with an unwoven fibrous material at a point intermediate their ends to provide a loop at the head end of the animal, transversely winding over said longitudinally extending strands at a point spaced inwardly from the end of said loop a plurality of strands to provide the outline of the head, spacing the lower strands of the loop from the upper strands to produce the outline of the mouth, forming loops in certain of said longitudinally extending strands at a point directly behind said transverse strands to produce the ears of the animal, lacing a strand about the upper strands in said loop to provide the configuration of the nostrils, wrapping a further plurality of strands transversely about the longitudinally extending strands to a thickness sufficient to give the body the desired contour, looping other strands over the body, joining them together beneath the body to provide projecting ends which form the base for the legs, looping other strands over the body alongside said first strands and wrapping them alternately in opposite directions about said projecting ends, interlocking the free ends of said latter strands, said latter strands being wrapped about said projecting ends to a thickness sufficient to provide the desired size for the animal's legs.

11. A process for forming a toy having the configuration of a horned ruminant which comprises forming the base of the body and head by bending a plurality of longitudinally extending flexible strands of metal covered with an unwoven fibrous material, at a point intermediate their ends to provide a loop at the head end of the animal, transversely winding over said longitudinally extending strands at a point spaced inwardly from the end of said loop a plurality of strands to provide the outline of the head, spacing the lower strands of the loop from the upper strands to produce the outline of the mouth, forming loops in certain of said longitudinally extending strands at a point directly behind said transverse strands to produce the ears of the animal, lacing a strand about the upper strands in said loop to provide the configuration of the nostrils, elevating others of said longitudinally extending strands above the head of the animal, forming projections at an angle to the main length of said strands to thus provide the horns for the ruminant, wrapping a further plurality of strands transversely about the longitudinally extending strands to a thickness sufficient to give the body the desired contour, looping other strands over the body, joining them together beneath the body to provide projecting ends which form the base for the legs, looping other strands over the body alongside said first strands and wrapping them alternately in opposite directions about said projecting ends, interlocking the free ends of said latter strands, said latter strands being wrapped about said projecting ends to a thickness sufficient to provide the desired size for the animal's legs.

12. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth.

13. A toy of the configuration of an animal composed entirely of flexible strands of metal covered with an unwoven fibrous material and having body, head and limb portions, the base of the body and head comprising a plurality of longitudinally extending strands having a loop at the head end of the animal, a number of other strands transversely overlying the body with their ends extended to provide the skeleton of the legs of the animal.

14. A toy of the configuration of an animal composed entirely of flexible strands of metal covered with an unwoven fibrous material and having body, head and limb portions, the base of the body and head comprising a plurality of longitudinally extending strands having a loop at the head end of the animal, the under strands of said loop being spaced from the upper strands to provide the outline of the mouth, and other strands looped over the body with their ends extended to provide the skeleton of the legs of the animal.

In testimony whereof I have hereunto set my hand.

JACOB L. KAUFMAN.